May 5, 1942. W. T. GRACE 2,281,762
PROCESS OF PRODUCING SULPHUR TRIOXIDE AND OXYGEN
Filed Nov. 15, 1939
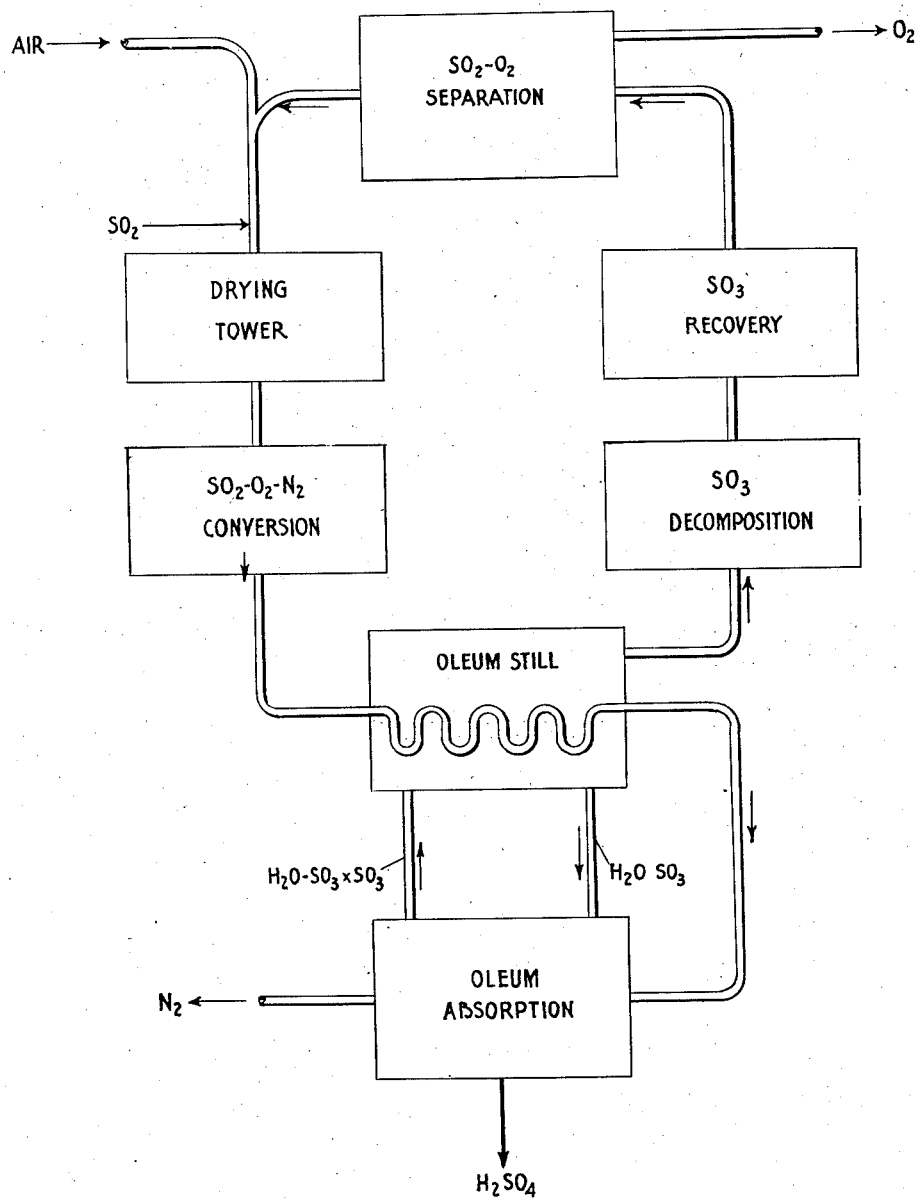
Worthington T. Grace    INVENTOR
BY *George T Johnson*
ATTORNEY Patented May 5, 1942

2,281,762

UNITED STATES PATENT OFFICE 2,281,762

PROCESS OF PRODUCING SULPHUR TRIOXIDE AND OXYGEN

Worthington T. Grace, Upper Darby, Pa., assignor to E. I. du Pont de Nemours & Company, Wilmington, Del., a corporation of Delaware Application November 15, 1939, Serial No. 304,482

2 Claims. (Cl. 23—167)

This invention relates to the manufacture of oxygen and has for its principal object to provide economical and efficient processes for recovering oxygen from the atmosphere, and as a further object to provide processes for recovering oxygen as an adjunct to the manufacture of contact sulphuric acid. A further object lies in the utilization of equipment available in contact sulphuric acid plants and in the provision of processes whereby a contact sulphuric acid plant may be readily converted to the manufacture of oxygen during off-peak periods or as desired. Further objects will appear hereinafter.

These objects are accomplished by the present invention, in which oxygen is combined with sulphur dioxide and regenerated therefrom by a combination of known processes including contact conversion, sulphur trioxide absorption and regeneration, sulphur trioxide decomposition, and sulphur dioxide recovery, which when associated, as will presently be described, effect separation of oxygen from the inert constituents of the atmosphere.

As illustrated diagrammatically in the accompanying flow sheet, sulphur dioxide, recycled from a suitable sulphur dioxide recovery unit or otherwise suitably obtained as from a sulphur burner, is mixed with air in proportions to provide a convertible mixture and then subjected to catalytic conversion. A suitable mixture will contain from about 5 to about 25 per cent sulphur dioxide, but to obtain proper heat balance for economic and efficient operation it is preferable to maintain the sulphur dioxide content between about 7 and 15 per cent. Such mixtures may be subjected to catalytic conversion using any of the contact converters common to and known in the sulphuric acid art. Any of the conventional platinum or vanadium type converters may be used, and the heat generated by the conversion may be recovered according to heat transfer practices known in the art.

The gases obtained from the contact conversion after being suitably cooled are passed into an absorption unit where sulphur trioxide is absorbed to an oleum concentration of at least about 5 per cent. The per cent oleum concentration is figured on the amount of sulphur trioxide in excess of the sulphur trioxide monohydrate. A lower concentration may not be used if the full advantages of my invention are to be obtained. Systems for recovering all or part of the sulphur trioxide as oleum of any desired concentration are well known in the art and need not be specifically described.

Oleum from the absorption is then led into a suitable oleum still in heat exchange with the conversion whereby sulphur trioxide in excess of the monohydrate is stripped off. The sulphur trioxide monohydrate is recycled to the absorption. Ordinarily it is best merely to pass hot converter gases in indirect heat exchange with the oleum, but, of course, any suitable type of heat exchange with one or more converters will suffice. It is with regard to indirect heat exchange, that is, passage of hot converter gases through oleum in a suitable boiler, that the oleum concentration is of especial significance, for at oleum concentrations of at least 13 per cent effective stripping coupled with effective cooling of the converter gases from absorption is obtained.

The highly purified sulphur trioxide thus obtained is then decomposed and oxygen is recovered in any suitable manner. It is well known that sulphur trioxide dissociates into sulphur dioxide and oxygen at temperatures above about 400° C., and that as the temperature is increased dissociation is directly proportional to the increase in temperature. It is impractical, however, to use temperatures sufficiently high to obtain complete dissociation, and as a result the decomposition gases may contain substantial quantities of sulphur trioxide which also must be separated from the mixture. In some cases, especially when the amount of sulphur trioxide is high, separation of sulphur trioxide, either in part or in its entirety, may be effected by the use of low temperatures and, if desired, superatmospheric pressure. If the quantity of sulphur trioxide is high a partial separation may be effected simply by cooling the gases sufficiently to liquefy the sulphur trioxide, and final separation may be effected by absorption in standard absorption equipment available in contact sulphuric acid plants. All the sulphur trioxide, of course, may be removed by absorption and recovered as 98% sulphuric acid or as oleum.

Unless the separation of the decomposition mixture is effected by liquefaction and fractionation, the mixture of pure sulphur dioxide and oxygen remaining after separation of sulphur trioxide must be further treated for the recovery of oxygen. Separation may be effected by liquefaction and fractionation in a known manner, and the wide discrepancy in the boiling points of liquid oxygen and liquid sulphur dioxide makes this type of separation highly desirable. Regenerative absorption processes employing chemical absorbents, such as nitrate-phosphate solutions, basic aluminum sulphate solutions, and the like may be used. Separation may also be effected by adsorption and desorption with solid adsorbents such as activated carbon, silica gel and the like.

The recovered sulphur dioxide may be recycled in admixture with the proper quantity of air to the conversion, and is capable of being used over and over again so that the net result of the process is that air is separated into two components, one consisting of oxygen and the other containing nitrogen and other constituents of the air. Sulphur dioxide, of course, must be introduced in an amount equivalent to that which is not converted to sulphur trioxide in the conversion. Conversion apparatus of high efficiency, however, is readily available so that no substantial loss is incurred in this respect. Sulphur dioxide also must be introduced in an amount equivalent to the water introduced by the air or in the absorption, but this is recovered in the process as sulphuric acid so that no loss is entailed.

The amount of sulphuric acid thus formed may be increased or decreased as desired by introducing both water and sulphur dioxide into the circulating system. Water, for example, may be admitted into the absorption in the customary manner and $SO_2$ may be introduced in a suitably concentrated form, or even as burner gases. Such practices will be found desirable in absorption systems containing not only oleum absorbers but also so-called 98% or clean-up absorbers.

The sulphur dioxide recovered from the sulphur dioxide-oxygen separation need not be recycled and, in fact, its high purity and concentration may make it desirable to use an impure source of sulphur dioxide, such as sulphur burner gas, and to recover the highly purified and concentrated sulphur dioxide as a product of the processes. By suitably modifying a conventional contact sulphuric acid plant, as described herein, any desired proportion of the sulphur trioxide from the conversion may be diverted to the manufacture of oxygen. Thus, the processes of my invention may be operated to produce pure oxygen or to produce both pure oxygen and pure sulphur dioxide, either with or without the simultaneous production of substantial quantities of sulphuric acid.

In systems where moisture is objectionable both the air and the sulphur dioxide may be dried separately or in admixture. If steam is used in the regeneration of sulphur dioxide it may be condensed out or otherwise removed before the sulphur dioxide is recycled to conversion. An exception may be noted, however, in the case of wet conversion and direct condensation processes.

Since these and many apparently widely differing embodiments of my invention may be made, it is to be understood that such variations as may be made without departing from the spirit and scope thereof are intended to be included within the appended claims.

I claim:

1. In the manufacture of oxygen the method of recovering oxygen from air which comprises mixing sulphur dioxide and air in proportions suitable for catalytic conversion of the sulphur dioxide to sulphur trioxide, subjecting the resulting mixture to catalytic conversion, absorbing sulphur trioxide from the thus formed conversion gases to an oleum concentration of at least 5%, passing oleum in heat exchange with said conversion gases to regenerate sulphur trioxide free of inert constituents of air, decomposing the sulphur trioxide thus formed to sulphur dioxide and oxygen, separating the sulphur dioxide and oxygen, and recycling sulphur dioxide to the conversion.

2. In the manufacture of sulphuric acid by the contact conversion of sulphur dioxide to sulphuric anhydride and the absorption of the sulphuric anhydride in sulphuric acid, the method whereby the conversion system may be operated under optimum conditions irrespective of the demand for sulphuric acid which comprises mixing sulphur dioxide and air in proportions suitable for catalytic conversion of the sulphur dioxide to sulphuric anhydride, subjecting the resulting mixture to catalytic conversion at a predetermined optimum rate independent of variations in the demand for sulphuric acid, absorbing sulphuric anhydride to an oleum concentration of at least five per cent, passing the oleum in heat exchange with said conversion gases to regenerate sulphuric anhydride free of inert constituents of air, decomposing the sulphuric anhydride thus formed to sulphur dioxide and oxygen, separately recovering the sulphur dioxide and oxygen and recycling sulphur dioxide to the conversion.

WORTHINGTON T. GRACE.